United States Patent [19]

Schmidl et al.

[11] Patent Number: 5,173,919
[45] Date of Patent: Dec. 22, 1992

[54] MANIPULATION OF THE EXIT GAS FLOW IN A MELTING FURNACE

[75] Inventors: Erwin Schmidl, Fislisbach; Markus Hubig, Hunzenschwil; Michael Hirth, Mellingen; Christian Wieckert, Baden, all of Switzerland

[73] Assignee: Asea Brown Boveri Ltd., Baden, Switzerland

[21] Appl. No.: 643,928

[22] Filed: Jan. 22, 1991

[30] Foreign Application Priority Data

Jan. 25, 1990 [CH] Switzerland ............... 216/90

[51] Int. Cl.⁵ .............................. C03B 5/027
[52] U.S. Cl. ........................ 373/37; 373/27; 373/29; 373/30; 373/31; 373/41; 373/110
[58] Field of Search .......... 373/27, 29, 30, 39, 373/31, 34, 36, 35, 37, 38, 41, 110

[56] References Cited

U.S. PATENT DOCUMENTS

| | | | |
|---|---|---|---|
| 1,267,317 | 5/1918 | Erskine | 373/31 |
| 1,594,496 | 8/1926 | Clark | 373/41 |
| 2,804,492 | 8/1957 | Eden | 373/37 |
| 3,198,618 | 8/1965 | Penberthy | 373/27 |
| 3,378,618 | 4/1968 | Vach et al. | 373/31 |
| 3,885,945 | 5/1975 | Rees et al. | 373/29 |
| 4,025,713 | 5/1977 | Suesser et al. | 373/40 |
| 4,207,065 | 6/1980 | Ackermann et al. | 373/30 |
| 4,852,118 | 7/1989 | Pieper | 373/32 |

FOREIGN PATENT DOCUMENTS

| | | |
|---|---|---|
| 0313902 | 10/1988 | European Pat. Off. |
| 2619084 | 12/1977 | Fed. Rep. of Germany |
| 2841026 | 3/1980 | Fed. Rep. of Germany |
| 586950 | 4/1925 | France |
| 2134346 | 12/1972 | France |
| 1207699 | 10/1970 | United Kingdom |

Primary Examiner—Bruce A. Reynolds
Assistant Examiner—Tu Hoang
Attorney, Agent, or Firm—Burns, Doane, Swecker & Mathis

[57] ABSTRACT

In a melting furnace (1), toxic, volatile chemical compounds from introduced filter dust from industrial incineration units are vaporized at about 1300° C. and forced to leave the reaction space. The non-vaporizing residue forms a glassy melt which is discharged continuously or intermittently from the reaction space. Heating of the melt and of the filter dust is affected by resistance heaters in protective ceramic sheaths (4) above the melt (2). In order to prevent corrosion of the resistance heater protection sheaths (4) by exit gases (7) especially in the flow lee thereof, the exit gases are forced, by partitions (10) and an exit gas extraction pipe (9) with an inlet orifice (16) at a low level, to flow below the resistance heater protection sheaths (4) to an exit gas outlet (5). The partitions (10) reach with their underside (14) from a ceiling region (17) into the gas space of the melting furnace (1) preferably to a level lower than that of the underside (15) of the resistance heater protection sheaths (4).

18 Claims, 2 Drawing Sheets

MANIPULATION OF THE EXIT GAS FLOW IN A MELTING FURNACE

BACKGROUND OF THE INVENTION

1. Field of the Invention

The invention relates to a method of manipulating the exit gas flow in a melting furnace and a melting furnace for carrying out the method.

2. Discussion of Background

EP-A1-0,313,902 discloses a method for the separation of toxic, volatile chemical compounds from a mixture of solid particles having a particle size of up to 200 μm. In this method electrostatic filter dust from industrial incineration units, containing noxious pollutants such as, for example, heavy metals and compounds thereof, is heated up to 1350° C. in a melting furnace. The toxic chemical compounds and elements thus vaporizing are removed from the melting furnace via a take-off, condensed and discharged. The non-vaporized residue is successively molten and the melt is discharged continuously or intermittently from the reaction space and caused to solidify. For heating, electric resistance heaters are provided in the gas space of the melting furnace. These heaters are separated from the furnace atmosphere by protective ceramic sheaths.

A disadvantage in this case is that the vaporizing toxic chemical compounds and elements attack and corrode the protective sheaths. This attack takes place to a particular extent in zones which are located in the flow path in the furnace interior.

SUMMARY OF THE INVENTION

The invention provides a novel method of manipulating the exit gas flow in a melting furnace, which largely prevents corrosion of the resistance heater protection sheaths. The invention also provides a melting furnace for carrying out the method of the invention.

One advantage of the invention is that the service life of the resistance heater protection sheaths can be considerably extended by simple means. As a result of the measure according to the invention, the chemical attack on the protective ceramic sheaths is markedly slowed down and distributed more uniformly over the entire surface of the sheaths.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3 and 3c show a front view and top view, respectively, of a melting furnace according to FIG. 1, but with lateral partitions, FIG. 4 being a cross section taken along the line 4—4 in FIG. 2.

DESCRIPTION OF THE PREFERRED EMBODIMENTS

Figure 1:
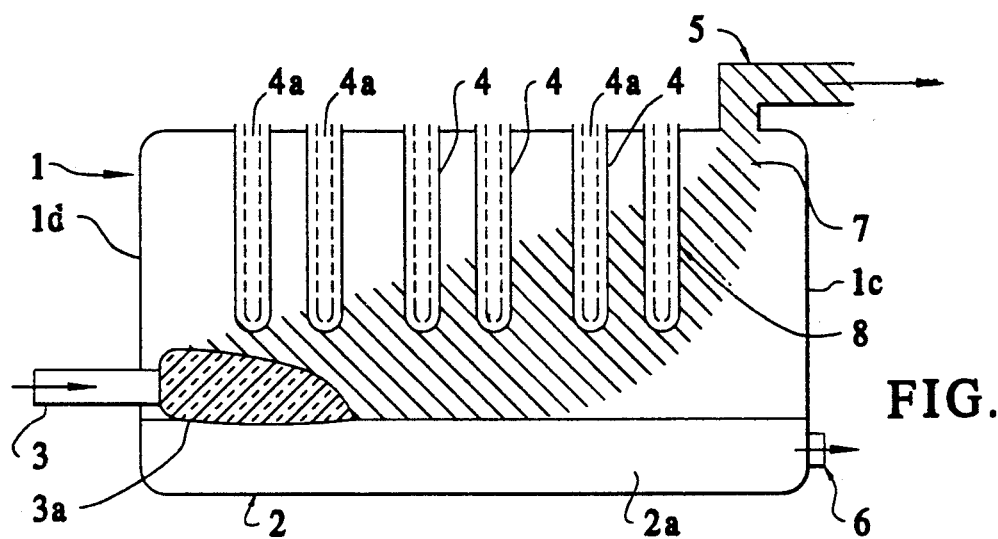
FIG. 1 shows a diagrammatic illustration of a melting furnace without manipulation of an exit gas flow in accordance with the invention.

Referring now to the drawings, wherein like reference numerals designate identical or corresponding parts throughout the several views, (1) in FIG. 1 designates a melting furnace which has a melting region (2) which is to receive a melt (2a) or glass melt, and also a charging hole (3) in wall (1d) for feeding filter dust (3a), a melt or glass discharge (6) in wall (1c), a plurality of protective sheaths or resistance heater protection sheaths (4) surrounding resistance heaters (4a) and projecting from above into the gas space of the melting furnace, and an exit gas outlet (5). The reference (7) designates an exit gas flow region or an exit gas flow, which passes from the vaporizing filter dust past the resistance heater protection sheaths (4) to the exit gas outlet (5). The reference (8) indicates a corrosion site in the flow path of a resistance heater protection sheath (4), which showed, in an experiment, a corrosion depth of about 1 mm in the protective ceramic sheath after about 1,000 operating hours.

In order to prevent this chemical attack, the exit gas flow is to be forced into a defined direction by means of suitable measures.

Figure 2:
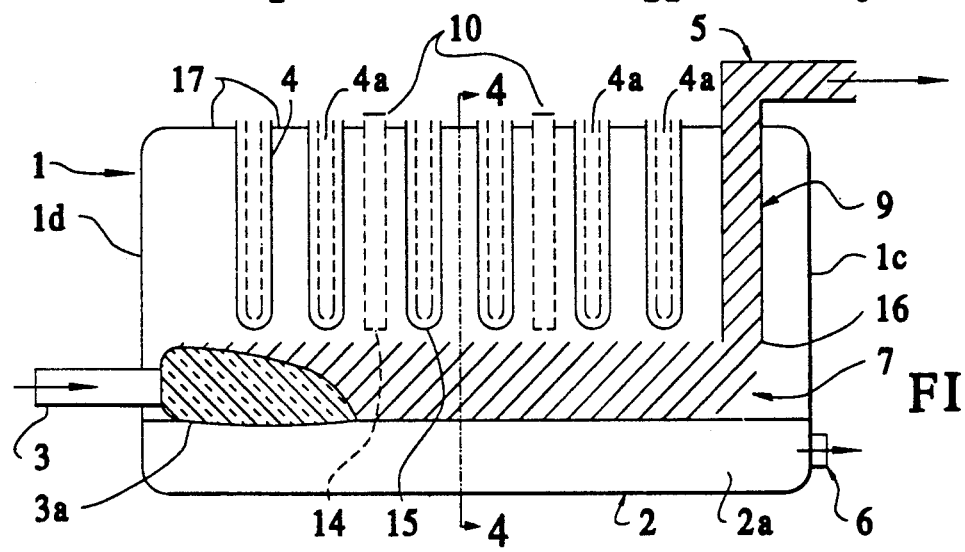
FIG. 2 shows a melting furnace according to FIG. 1 with partitions for guiding the exit gas FIG. 3 being a cross section taken along the line I—I in FIG. 3a, an exit gas extraction pipe extended.
Figure 4:
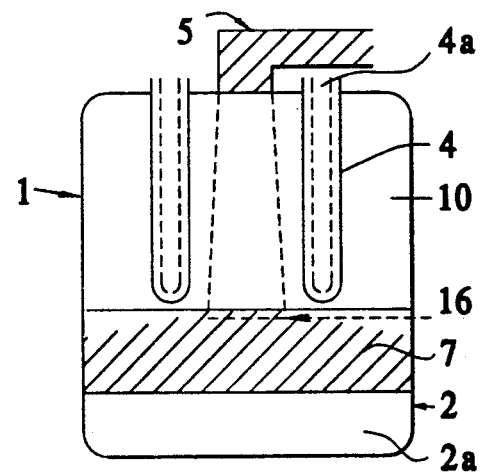
FIG. 4 shows a front view of a melting furnace according to FIG. 2 with continuous partitions.
Figure 6:
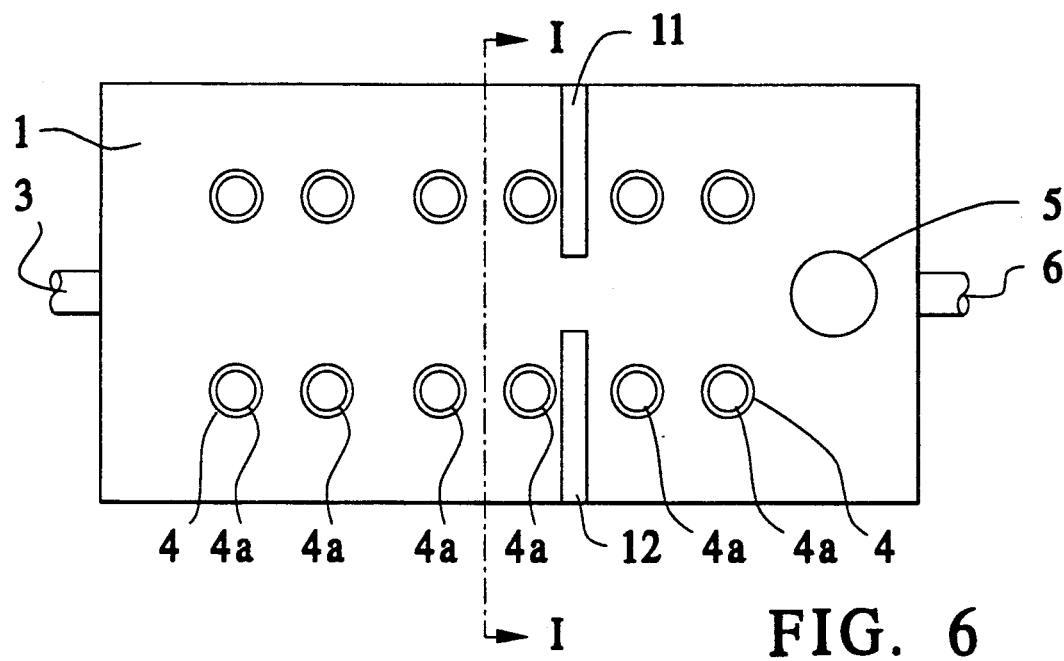
FIG. 6 is the cross section taken along the line V—V in FIG. 3.

FIG. 2 shows a melting furnace (1), in which the exit gas flow (7), by means of partitions (10) projecting downwards from a ceiling region (17) of the melting furnace (1) and indicated in dots and a likewise downward-extended exit gas extraction pipe or an exit gas extraction device (9) having a lower inlet orifice (16), passes up to the latter essentially horizontally between the surface of the melt and an underside (14) of the partitions (10). As shown in FIG. 4, the partition (10) can extend between opposite walls (1a, 1b) of the furnace (1). The underside (14) of the partitions (10) and the inlet orifice (16) are located at a level at least as low as an underside (15) of the resistance heater protection sheaths (4), preferably more than 2 cm lower. In the case of a lateral arrangement of the exit gas extraction pipe (not shown), the inlet orifice is preferably inclined downwards (not shown), in order to pass liquid concentrate back into the melt. As the material for the partitions, corrosion-resistant bricks are used which can contain, inter alia, chromium oxides and manganese oxides. The melt consists predominantly of a glassy substance which absorbs the non-vaporizing residue and a part of the heavy metals. A temperature of about 1300° C., which is sufficient for vaporizing most of the heavy metals and the other pollutants from the filter dust, is generated by radiant heat in the melting furnace (1) by means of the resistance heater protection sheaths (4).

Figure 3:
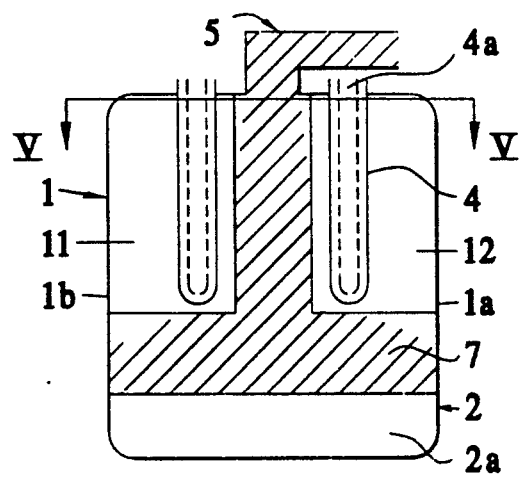

In the embodiment of the invention according to FIG. 3, the gas take-off is provided on the furnace ceiling (17), two lateral partitions (11, 12) leaving free, in the middle, a kind of chimney through which the exit gas flow (7) reaches the exit gas outlet (5). As shown in FIG. 3, the partitions (11, 12) can be parallel to each other and extend from opposite walls (1a, 1b) of the furnace (1).

In the front view of the melting furnace (1) according to FIG. 4, continuous partitions (10) are provided, the gas extraction pipe (9) with its inlet orifice (16) being taken down to just above the melt region (2).

The important point is that a barrier means is provided which prevents significant quantities of the corrosive exit gas from being able to pass to the resistance heater protection sheaths (4). The downward-extended exit gas extraction pipe (9) already meets this purpose. The partitions (10-12) reinforce this effect.

Figure 5:
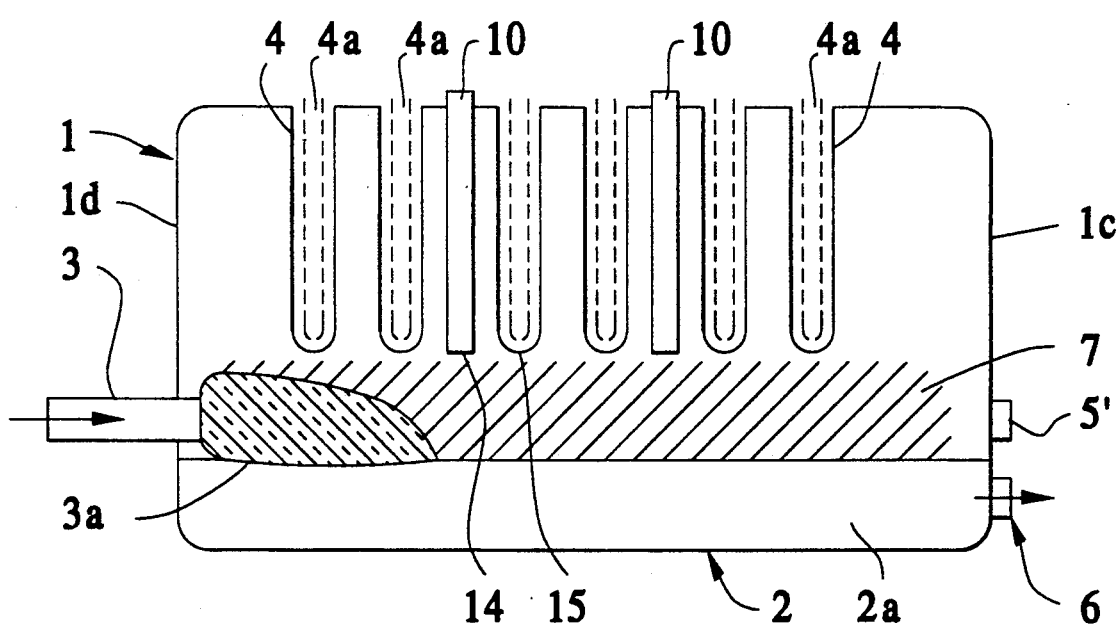
FIG. 5 shows a melting furnace according to FIG. 1 but with an exit gas extraction pipe inclined downwards through the furnace wall.

A further possible embodiment of the invention consists in extracting the gases directly above the melt surface through an exit gas extraction pipe 51 which leads laterally through the furnace wall and is inclined downwards, as shown in FIG. 5.

Obviously numerous modifications and variations of the present invention are possible in the light of the above teachings. It is therefore to be understood that, within the scope of the appended claims, the invention may be practiced otherwise than as specifically described herein.

What is claimed as new and desired to be secured by letters patent of the United States is:

1. A method of manipulating a gas in a melting furnace which includes a melting region and at least one resistance heater, the resistance heater being encased in a protection sheath and arranged in the furnace to heat a melt in the melting region, the method comprising the steps of:
   passing the gas through the melting furnace along a flow path past the protection sheath to an exit gas outlet in the furnace, the gas being directed through the furnace by barrier means for minimizing chemical attack of the gas on the protection sheath.

2. The method of claim 1, wherein the gas is passed to the exit gas outlet in a region above the melt and below the protection sheath and the barrier means forces the gas in a direction away from the protection sheath.

3. The method of claim 1, wherein the at least one resistance heater comprises a plurality of spaced-apart resistance heaters and a plurality of protection sheaths, each of the resistance heaters being encased in a respective one of the protection sheaths, the barrier means forcing the gas in a direction away from the protection sheaths.

4. The method of claim 3, wherein each of the protection sheaths has a lower end located above the melt and the gas is directed between an upper surface of the melt and the lower end of each of the protection sheaths.

5. The method of claim 4, wherein the barrier means includes at least one partition, the partition having a lower end located closer to the upper surface of the melt than the lower end of each of the protection sheaths.

6. The method of claim 5, wherein the at least one partition comprises two spaced-apart partitions, the gas passing through a space between the two partitions during movement of the gas along the flow path to the exit gas outlet.

7. The method of claim 1, wherein the gas is formed by gas produced by the melt.

8. The method of claim 1, wherein the exit gas outlet comprises an exit gas extraction pipe having an inlet orifice located closer to an upper surface of the melt than a lower end of the protection sheath.

9. A melting furnace comprising:
   a melting region for a melt;
   at least one resistance heater, the resistance heater being encased in a protection sheath, the resistance heater and protection sheath being arranged in the furnace to heat a melt in the melting region during operation of the furnace;
   an exit gas outlet;
   barrier means for directing a gas in the furnace along a flow path past the protection sheath to the exit gas outlet whereby said gas minimizes chemical attack on the protection sheath.

10. The furnace of claim 9, wherein the barrier means comprises at least one partition projecting from a ceiling region of the furnace, the partition having a lower end located above a melt in the melting region during operation of the furnace, the protection sheath having a lower end located above the melt and the lower end of the partition.

11. The furnace of claim 9, wherein the barrier means comprises an exit gas extraction pipe which has a lower end located above a melt in the melting region during operation of the furnace, the protection sheath having a lower end located above the melt and the lower end of said exit gas extraction pipe.

12. The furnace of claim 9, wherein the at least one resistance heater comprises a plurality of resistance heaters, the resistance heaters being arranged in at least two rows, each of the rows including at least two of the resistance heaters, the barrier means comprising two partitions separated by a space through which the gas passes to the exit gas outlet.

13. The furnace of claim 12, wherein the two partitions are parallel and extend towards each other from opposite walls of the furnace, the space being located between the partitions.

14. The furnace of claim 13, wherein each of the partitions is located between two of the protection sheaths, one of the partitions being located in one of the rows of the resistance heaters and the other one of the partitions being located in the other one of the rows of the resistance heaters.

15. The furnace of claim 11, wherein the exit gas extraction pipe extends laterally through a wall of the furnace.

16. The furnace of claim 15, wherein the exit gas extraction pipe is inclined.

17. The furnace of claim 10, wherein the partition extends between opposite walls of the furnace.

18. The furnace of claim 10, wherein the at least one partition comprises two partitions, the two partitions being spaced apart along the flow path, at least one of the protection sheaths being located in a space between the two partitions, each of the two partitions extending between opposite walls of the furnace.

* * * * *